US012761010B2

(12) United States Patent
Wen et al.

(10) Patent No.: US 12,761,010 B2
(45) Date of Patent: Oct. 13, 2026

(54) CURVED SURFACE MEASUREMENT DEVICE AND METHOD FOR PREPARATION THEREOF

(71) Applicant: National Yang Ming Chiao Tung University, Hsinchu City (TW)

(72) Inventors: Kuei Ann Wen, Hsinchu County (TW); Yu Jie Huang, Hsinchu City (TW)

(73) Assignee: National Yang Ming Chiao Tung University, Hsinchu City (TW)

( * ) Notice: Subject to any disclaimer, the term of this patent is extended or adjusted under 35 U.S.C. 154(b) by 905 days.

(21) Appl. No.: 18/156,602

(22) Filed: Jan. 19, 2023

(65) Prior Publication Data

US 2024/0053133 A1 Feb. 15, 2024

(30) Foreign Application Priority Data

Aug. 15, 2022 (TW) ................................ 111130673

(51) Int. Cl.
*G01B 7/28* (2006.01)
*G01B 7/287* (2006.01)

(52) U.S. Cl.
CPC ............ *G01B 7/281* (2013.01); *G01B 7/287* (2013.01)

(58) Field of Classification Search
CPC ........... G01B 7/28; G01B 7/281; G01B 7/287
See application file for complete search history.

(56) References Cited

U.S. PATENT DOCUMENTS

| | | | | |
|---|---|---|---|---|
| 2010/0042357 | A1* | 2/2010 | McCoy, Jr. | B25J 9/1694 702/141 |
| 2020/0143085 | A1* | 5/2020 | Cooner | G06F 21/6263 |
| 2020/0246999 | A1* | 8/2020 | Jin | B27B 31/00 |
| 2023/0013094 | A1* | 1/2023 | Toom | G01C 7/04 |

* cited by examiner

*Primary Examiner* — Paul M. West
(74) *Attorney, Agent, or Firm* — BACON & THOMAS, PLLC

(57) ABSTRACT

Curved surface measurement device comprises a plurality of vector sensors, each comprising: a main body and a vector device connected thereto. The vector device comprises a linear extension, with an end provided with a connector for connecting with the main body of another vector sensor; a sensing chip to sense the vector of gravity; a wireless communication circuit to transmit to the external a sensing value of the sensing chip. Computing device calculates the vector value of the end of the linear extension relative to the gravity, the result of which is a plurality of point representing a curve in the space. Method for preparation of the vector device is disclosed.

28 Claims, 6 Drawing Sheets

CURVED SURFACE MEASUREMENT DEVICE AND METHOD FOR PREPARATION THEREOF

TECHNICAL FIELD

The present invention relates to a curved surface measurement device, in particular, to a curved surface measurement device used in the fields of medical treatment and rehabilitation.

BACKGROUND OF THE INVENTION

There are many applications that need to measure curved surfaces, especially the vector from one point to another on a curved surface. This measurement cannot be done in a conventional way, e.g., optically. One reason for this is that there may be protruding surfaces between the two points, blocking the travel of light. Many researchers are looking for solutions that can overcome these challenges.

U.S. Pat. No. 5,960,370 discloses a two-dimensional position determining arrangement, which is applied to a method of measuring the local variation of the earth's magnetic field relative to a moving object and the position of a magnet. An elongated housing is used to house sensors that measure the gravity vector with respect to the length of the housing. Measurements along the 3-component axes of the magnetic sensor housing at each measurement point are resolved using the gravity vector measured on or along 3-perpendicular axes to determine tool inclination and rotation about the tool axis. The measurements on the magnetic sensor axes are converted to equivalent values in a rectangular coordinate system having one horizontal component in the direction of the wellpath at the measurement point, a second horizontal component perpendicular to the wellpath direction, and a vertical component. The measurement results of each point draw a curve.

DE19737142A1 discloses an arrangement for two-dimensional position determination of a measured object. The device comprises a flat square-shaped magnet (1) made of a magnetically hard material and coupled to the measured object, in which the direction of magnetization (M) of the magnet (1) extends parallel to a first axis of movement (X) of the measured object. First and second magnetic field-sensors (S1, S2) are arranged on a surface parallel to the bottom face of the magnet (1) for detecting the normal component of the magnetic field caused by the magnet and extending normal to the bottom face of the magnet (1). The two sensors (S1, S2) are at the same distance from the measured object along the first axis of movement (X) and have a fixed distance (Ds) between them along a second axis of movement (Y) which extends normal to the first axis of movement (X) in the range of movement of the measured object and are positioned at the same fixed distance from the bottom face of the magnet (1). A conversion unit (2) is coupled to both sensors (S1, S2) and processes the measured values (M1) received from the sensors. A storage unit (4) is used for storing the normal component of the magnetic field as a family of characteristics in the form of (Hx, Hy*).

U.S. Pat. No. 11,144,063B2 discloses a system, method, and apparatus for inspecting a surface. A sled array system enables accurate, self-aligning, and self-stabilizing contact with a surface while also overcoming physical obstacles and maneuvering at varying or constant speeds, wherein a payload is an arrangement of sleds with sensor mounted thereon.

It can be seen from the description of the prior art that there is a strong demand in the industry for the measurement of curved surfaces, regardless of the scale of the measure device. Various technologies have emerged. The solutions in the prior art are to use a magnetometer to measure the change of the geomagnetic field to calculate the coordinates of each point on the curved surface. In order to improve the accuracy of measurement, the prior art also develops a method to ensure that the sensing axis of the sensor and the substrate surface maintain a fixed relative relationship. However, the proposed methods still cannot guarantee that the relationship can be maintained constant, to avoid the accumulation of the drift amount during the measurement process. In addition, the method of maintaining the relative relationship in the prior art is not applicable to substrates of other than magnetic materials.

SUMMARY OF THE INVENTION

The objective of the present invention is to provide a novel curved surface measurement device, to measure a section of a curved surface and generate position information of a plurality of measured points.

Another objective of the present invention is also to provide a curved surface measurement device, to measure a section of a curved surface with minimum accumulation of drift.

Another objective of the present invention is also to provide a device that can measure curved surfaces of different materials and obtain correct results.

Another objective of the present invention is also to provide a preparation method of a curved surface measuring device.

According to a first aspect of the present invention, a curved surface measurement device is provided and comprises a first vector sensor and a plurality of second vector sensors; each vector sensor comprises:

- a main body and a vector device connected to the main body; the vector device comprising a linear extension, preferably a linearly extending rod, a far end of the vector device remote from the main body providing a first connector;
- a second connector arranged on the main body, at an end opposite to the vector device, or within an area of the main body, wherein an opening or a cutout is provided in said end of the main body for access of a first connector of another vector sensor, to form a rotatable connection with the second connector; the second connector preferably being arranged on the plurality of second vector sensors;
- wherein the first connector is provided with a connecting member, and the second connector is provided with a rotating connecting member for connecting with the connecting member of the first connector; and wherein the second connector is located on an extension line of the vector device;
- a sensing chip preferably comprising an inertial sensor for sensing a vector of gravity to generate a gravity vector sensing value;
- a wireless communication circuit, connected to the sensing chip, to transmit the sensing value to the external through a wireless communication channel; and
- a power supply for providing electrical power to the sensing chip and/or the wireless communication circuit;

wherein a sensing value signal transmitted by the wireless communication circuit comprises the sensing value and a code representing the vector sensor.

In a preferred embodiment of the present invention, the sensing value signal transmitted by the wireless communication circuit further comprises vector values of a vector from the sending chip to the first connector of the vector sensor.

In a preferred embodiment of the present invention, in the second vector sensor, the position of the sensing chip preferably projects to an area of the rotating connecting member of the second connector.

In a preferred embodiment of the present invention, the length of the sensing chip to the first connector of the vector device is preferably the same for each vector device.

A preferred embodiment of the vector sensor of the present invention may further comprise a processing circuit, coupled to the sensing chip, for receiving a sensing result of the sensing chip, and converting said sensing result into spatial position representation data, such as coordinate values or vector values, to determine a relative vector value of a vector from the sensing chip to the first connector relative to a vector of the gravity, and/or an absolute vector value of the vector from the sensing chip to the first connector. In such embodiments, the power supply further provides power to the processing circuit.

The vector sensor can also provide an attachment element for attaching the main body to a measured surface. In a preferred embodiment of the present invention, a center of the attachment element projects into an area of the sensing chip.

The curved surface measurement device may further comprise a computing device equipped with a wireless communication function to receive the sensing result of each vector sensor, then calculate a relative or absolute vector value of a vector from the sensing chip to the first connector of each vector sensor. The computing device can also calculate a relative vector value of a vector from the sensing chip of the first vector sensor to the first connector of the vector device of the Nth second vector sensor.

In a preferred embodiment of the present invention, only one or more vector sensors are equipped with the processing circuit. Each sensing chip transmits the sensing result to the processing circuit via the wireless communication circuit, for calculation of the relative vector value of each sensing chip to a corresponding first connector of the respective vector devices. In such an embodiment, the processing circuit may also be configured to calculate the relative vector value of a vector from the sensing chip of the first vector sensor to the first connector of the Nth second vector sensor. The processing circuit may be provided in the first vector sensor or one of the plural second vector sensors.

In a preferred embodiment of the present invention, the connecting member of the first connector can be a connecting hook or a connecting ring, and the rotating connecting member of the second connector can be a shaft. A flange can be provided at the periphery of the shaft with a certain width to regulate the rotation of the connecting hook or connecting ring.

In a specific embodiment of the present invention, the sensing chip is equipped with a memory device for storing a value of the vector of the first connector relative to the sensing chip, and a code corresponding to the vector sensor. In this embodiment, the computing device and/or the processing circuit calculates the relative vector value of a vector from the sensing chip to the corresponding first connector of each vector sensor, or a vector from the sensing chip of the first vector sensor to the first connector of the Nth second vector sensor, according to the stored code, the stored vector value, both of each sensing chip, and a processing result of the processing circuit.

In other embodiments of the present invention, the sensing results of individual vector sensors are used to calculate a direction of a vector from the sensing chip to the first connector of a vector sensor, relative to the vector of the gravity. The direction can be represented by an angle of the direction projecting on a specific plane. In such an example, each of the vector can be expressed in the form of [angle, length from the sensing chip to the first connector].

In such embodiments, the inertial sensor may comprise a gyroscope.

A second aspect of the present invention provides a method for manufacturing a vector sensor of a curved surface measurement device. The method comprises the following steps:

- providing a mold; the mold providing a vector sensor forming space, including a second connector forming space;
- providing a chip holder, the chip holder providing a sensing chip accommodating space;
- placing the chip holder in the mold, so that the sensing chip accommodating space of the chip holder projects into an area occupied by the second connector forming space;
- providing a chip set, the chip set comprising a sensing chip that comprises an inertial sensor, and a processing circuit electrically connected to the sensing chip;
- placing the chip set in the sensing chip accommodating space of the chip holder and positioning it; and
- applying material of a vector sensor to the vector sensor forming space and hardening the material.

The method may further comprise the steps of demolding and curing the vector sensor.

The above objectives and advantages of the present invention will become more apparent from the following detailed description with reference to the accompanying drawings.

DETAILED DESCRIPTION OF THE INVENTION

Hereinafter, several embodiments of the curved surface measuring device and the manufacturing method thereof of the present invention will be described with reference to the drawings.

Figure 1:
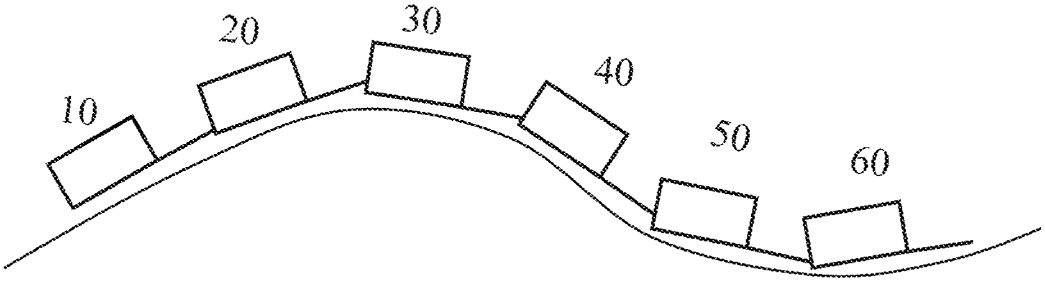
FIG. 1 shows a perspective view of an embodiment of the curved surface measurement device of the present invention.

FIG. 1 shows the perspective view of an embodiment of the curved surface measurement device of the present invention. As shown in the figure, the curved surface measurement device of the present invention comprises a first vector sensor 10 and a plurality of second vector sensors 20-60. The figure shows 5 second vector sensors 20-60 are used in this embodiment. However, the quantity of the second vector sensors is not limited. In application, the number of the second vector sensors can be arbitrarily determined according to the purpose of the measurement and the required measurement resolution.

Figure 2:
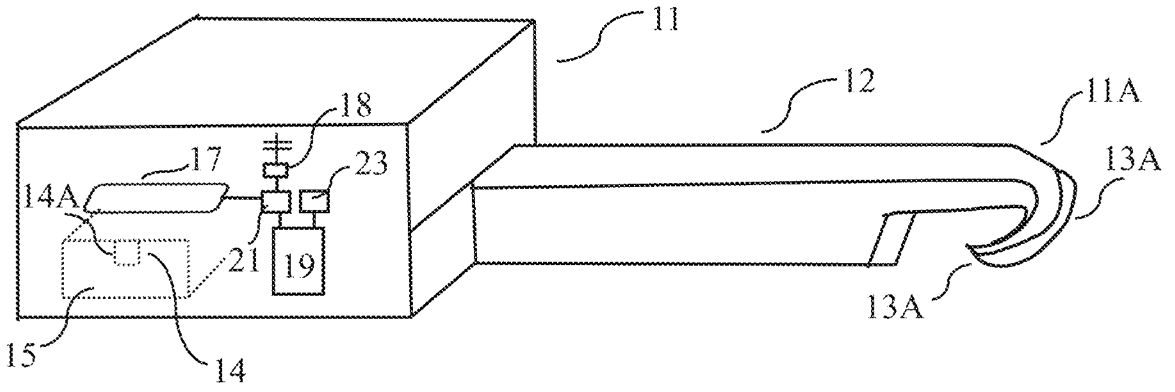
FIG. 2 shows a cross-sectional view of a vector sensor use in an embodiment of the curved surface measurement device of the present invention.

FIG. 2 shows a cross-sectional view of a vector sensor suitable for use in the invented curved surface measurement device. As shown in the figure, the vector sensor includes a main body 11 and a vector device 12 connected to the main body 11. The vector device 12 comprises a linear extension, which is shown as a linearly extending rod. The vector device 12 is provided with a first connector 13 at the end 11A remote from the main body 11.

A second connector 14 is arranged under the main body 11, and an opening or a cutout 15 is provided in the main body 11 for the first connector of another vector sensor to enter, to form a rotatable connection with the second connector 14. The second connector 14 can also be disposed on the sensor main body 11, at the opposite end of the vector device 12. However, in a preferred embodiment of the present invention, the second connector 14 is disposed within the coverage of the main body 11. In a preferred embodiment of the present invention, the second connector is only disposed on the plurality of second vector sensors 20-60, but not on the first vector sensor 10. However, considering the convenience of manufacture, the first vector sensor 10 can also be provided with the second connector 14, but it is not used during operation.

The first connector 13 is provided with a connecting member 13A, and the second connector 14 is provided with a rotating connecting member 14A for connecting with the connecting member 13A, preferably a rotatable connection, of another vector device. In a preferred embodiment of the present invention, the second connector 14 is located on the extension line X of the vector device 12.

In the embodiment shown in FIG. 2, the connecting member 13A of the first connecting member 13 forms a connecting hook. However, other forms of connecting member, such as connecting rings, etc., are also applicable to the present invention. The rotating connecting member 14A of the second connector 14 shown in the figure is a shaft. However, any other element that can couple with the connecting member 13A of the first connector 13 to form a rotatable connection can be applied to the present invention. The figure also shows that a certain distance from the periphery of the shaft rod 14A can be provided, to form a flange 16 to regulate the rotation of the connecting member 13A, i.e., the connecting hook or the connecting ring.

The second vector sensor 20 with the above-mentioned features can form rotatable connection with a first vector sensor 10 or another second vector sensor 20, by connecting the first connector 13 of the other vector sensor with the second connector 14 of the second vector sensor 20, with the vector device 12 of the other vector sensor penetrating through the cutout 15 of the second connector 14.

The first connector 13 preferably forms integrally with the vector device 12. The second connector 14 preferably forms integrally with the main body 11. However, it is also possible to prepare the first connector 13 and the second connector 14 separately, then combine them with the vector device 12 and the main body 11, respectively.

In addition, the main body 11 and the vector device 12 are also preferably formed in one piece. But it is also possible to make them separately and then combine them. A preferred embodiment of the manufacturing method of the vector sensor according to the present invention is to use a single mold to manufacture the main body 11, the vector sensor 12, as well as to form the first connector 13 and the second connector 14. However, the manufacturing method of the present invention is not limited to the method of this embodiment.

FIG. 2 shows a sensing chip 17 arranged in the main body 11 for sensing the vector of gravity, and for generating the sensing value of the gravity vector. The sensing chip 17 preferably includes an inertial sensor, such as an accelerometer or a gyroscope. The gravity sensed by the inertial sensor can usually be expressed as a vector value, such as the three-dimensional component of coordinate values or an angular vector value.

According to the preferred embodiments of the present invention, the gravity vector is used to infer the vector value represented by the vector device 12 in space. Therefore, other reference values that can be used to generate a vector value represented by the vector device 12 can be applied to the present invention.

To be specific, the sensing chip 17 is disposed in the main body 11 of the vector sensor. When the vector sensor is fabricated, the vector of the end point of the vector device 12, that is, the relative vector value of the vector from the sensing chip 17 to the first connector 13 of the vector device 12, relative to the vector system of the sensing ship 17, is known. In addition, while in production, usually through strict process control, the relative vector value can be set to a fixed value, such as (x, 0, 0), if represented by a coordinate value. Nonetheless, if the gravity vector is expressed by a coordinate value, its absolute coordinate value can be expressed as (0, 0, −1). Therefore, as long as the relative vector value of the gravity vector relative to the vector system of the sensing chip 17 is measured by the sensing chip 17, the absolute vector value of the vector from the sensing chip 17 to the end point of the vector device 12 can be obtained.

A sensor chip with the above technical features can be any commercially available sensor, or after necessary modification. Sensor chips applicable to the present invention include NORDIC® nRF51822 and other sensor products with the equivalent functions.

The vector sensor 10, 20. is provided with a wireless communication circuit 18, which is also configured in the main body 11. The wireless communication circuit 18 is connected to the sensing chip 17 for transmitting the sensing result of the sensing chip 17 to the outside world through a wireless communication channel. Any commercially available product can be used for the wireless communication circuit 18. For example, the above-mentioned NORDIC® nRF51822 sensor chip is equipped with a Bluetooth wireless communication function and can be applied to the present invention. Other sensor chips, circuit IPs, etc. with short-range wireless communication functions can also be applied to the present invention.

The vector sensor 10, 20. is also equipped with a power supply device 19 for supplying power to the sensing chip 17 and the wireless communication circuit 18, as well as other components and circuits that need to use electrical power.

In most preferred embodiments of the present invention, the vector sensor 10, 20. is provided with a memory device 23 for storing the sensing results of the sensing chip 17 and data required for processing the sensing results of the sensing chip 17. In certain embodiments of the present invention, the memory device 23 may be disposed within the sensing chip 17. However, it can be a separate component, circuit that forms signal connections with the sensing chip 17. If it is an independent circuit or component, the power supply device 19 also supplies electrical power to the memory device 23.

The data stored in the memory device 23 are not limited, but preferably include: the relative vector value of the connecting member of the first connector 13 relative to the sensing chip 17, and the code of the vector sensor 10, 20, corresponding to the sensing chip 17. In addition, a read value of the sensing result of the sensing chip 17 and a corresponding sensing time stamp can also be included. In such an embodiment, each sensing value can be associated with a specific sensing time and code for that sensor. In addition, each sensing value (gravity vector value) is also associated with the relative vector value stored of the connecting member of the first connector 13 relative to the vector system of the sensing chip 17. In such an embodiment, the sensing value signal transmitted by the wireless communication circuit 18 each time may include the code of the vector sensor. The sensing value signal transmitted by the wireless communication circuit 18 also includes the relative vector value of the vector device 14 of the vector sensor 12 with respect to the vector system of the sensing chip 17. However, the relative vector value does not need to be transmitted every time the sensing result signal is transmitted. The sensing value signal transmitted by the wireless communication circuit 18 each time may also include a time stamp, but the time stamp may also be generated by an element/device that receives the sensing value signal, such as a processing circuit or the first vector sensor 10 or one of the plurality of second vector sensors 20-60, and is associated to the sensing value.

The preferred embodiment of the vector sensor of the present invention may further include a processing circuit 21 for converting the sensing result of the sensing chip 17 into spatial position representation data, such as coordinate values or vector values. In a preferred embodiment of the present invention, the processing circuit 21 is connected to the sensing chip 17 to receive the sensing result data of the sensing chip. The processing circuit 21 converts the sensed values into spatial position representation data, such as coordinate values or vector values. For example, the sensing chip 17 can sense the vector of gravity, when it is stationary, to generate a gravity vector sensing value, representing the relative vector value of the gravity vector with respect to the vector system of the sensing chip 17. Since the relative vector value of the vector device relative to the vector system of the sensing chip is known, the processing circuit 21 can calculate the relative vector value of the vector from the sensing chip 17 to the first connector 13 of the vector device relative to the gravity vector. In addition, since the absolute vector of the gravity vector is known, the processing circuit 21 can also calculate the absolute vector value of the vector from the sensing chip 17 to the connection portion of the first connector 13 of the vector device according to the absolute vector value of gravity. The above vector values can all be represented by coordinate values (Cartesian coordinates or polar coordinates) or as vector values. In this embodiment, the power supply device 19 also provides power to the processing circuit 21, and the sensed value sent by the wireless communication circuit 18 is the calculated relative vector value or absolute vector value.

When calculation, if the relative vector value of the vector from the sensing chip 17 to the first connector 13 of the vector device, relative to the gravity vector is to be calculated, the following formula (1) can be used:

Assume that the relative vector value of the vector from the sensing chip 17 to the first connector 13 of the vector device, relative to the vector system of the sensing chip 17 is represented by Cartesian coordinates as (x11, 0, 0) and that the gravity vector detected by the sensing chip 17 is (x12, y12, z12), then the relative vector value of the vector from the sensing chip 17 to the first connector 13 of the vector device, relative to the gravity vector, expressed in Cartesian coordinates as (x10, y10, z10), can be calculated by the following formula (1):

$$(x10,y10,z10)=(x11-x12,y11-y12,z11-z12) \quad (1)$$

On the other hand, if the absolute vector value of the vector from the sensing chip 17 to the first connector 13 of the vector device is to be calculated, the following formula (2) can be used:

Assume that the relative vector value of the vector from the sensing chip 17 to the first connector 13 of the vector device, relative to the vector system of the sensing chip 17 is represented by Cartesian coordinates as (x11, 0, 0) and that the gravity vector detected by the sensing chip 17 is (x12, y12, z12). Since the absolute vector value of the gravity is known and is (0, 0, −1), the absolute vector value of the vector from the sensing chip 17 to the first connector 13 of the vector device, expressed in Cartesian coordinates as (x10, y10, z10), can be calculated by the following formula (2):

$$(x10,y10,z10)=(x11-x12,y11-y12,z11-z12+1) \quad (2)$$

The processing circuit 21 with the above computing capabilities can be any commercially available processor, with or without necessary modifications. In addition, the above-mentioned NORDIC® nRF51822 product also provides processing circuits with these functions. A skilled person can use anyone of them to implement the present invention accordingly.

In other embodiments of the present invention, the sensing chip 17 includes an gyroscope for calculating the included angle and length of the vector from the sensing chip 17 to the first connector 13 of the vector device with respect to gravity vector. In the calculation, let the length of gravity be 1 unit length or other appropriate length. This vector (vector 10) can be expressed as:

$$\text{Vector } 10=L10,\theta 10 \quad (3)$$

In a preferred embodiment of the present invention, only one or more vector sensors may be equipped with the processing circuit 21, or only the processing circuit 21 of one or more vector sensors provide the processing function. In this embodiment, each sensing chip 17 transmits the sensing result, i.e., the individually detected gravity vector value, to the working processing circuit 21 via the wireless communication circuit 18. The working processing circuit 21 calculates the relative vector value of each sensing chip according to the sensing values sent by each vector sensor 10 and 20. In such an embodiment, the processing circuit may also be configured to calculate the relative vector value of the vector from the sensing chip 17 of the first vector sensor to the first connector 13 of the Nth second vector sensor.

In another embodiment of the present invention, a separate computing device 30 is provided, so that the individual vector sensors 10 and 20 do not need to have the processing circuit 21. The computing device 30 is equipped with a wireless communication function to receive the sensing or processing results of each of the vector sensors 10 and 20 and calculate, using the calculating capability of the computing device 30, the relative vector value of the vector from the sensing chip 17 to the first connector 13 of the vector device, of each vector sensor 10 and 20 accordingly. The calculating device 30 may also be configured to calculate the relative vector value of the vector from the sensing chip 17 of the first vector sensor 10 to the first connector 13 of the vector device of the Nth second vector sensor 20. The computing device 30 used in such embodiments can typically be any mobile device, such as a smartphone. For example, a smartphone APP can be written to connect with the first vector sensor 10 and the plurality of second vector sensors 20, receive the sensing values of the individual vector sensors 10 and 20, and process the sensing values, the measured vector values, or other useful data. The smartphone APP can also be configured to draw on the display device a shape of a curved surface represented in sequence by the measurement results of the vector sensors 10 and 20 according to the calculated results.

In the above embodiments, the computing device 30 and/or the processing circuit 21 calculate to produce the vector values detected by the respective vector sensors 10 and 20, or the vector from the sensing chip of the first vector sensor 10 to the first connector 13 of the vector device of the Nth vector sensor, according to the and the vector sensing data code of each sensing chip, and the processing result of the processing circuit, if any.

When in use, the plurality of vector sensors 10 and 20 are connected head to tail, so that the first connector of a vector sensor is connected to the second connector of a next vector sensor. Stretch the series of vectors and arrange the vector sensors in sequence on the surface to be measured, so that each vector sensor is located at a point in a curve. If there is an attachment element or fixing element, attach or fix the attachment element or fixing element to the measured surface. Turn on the power of the vector sensors, and use the smartphone APP to receive the sensing results of the respective vector sensors. Input the vector value or coordinate value of the sensing result into a surface drawing application software, such as one application software equipped with the Bezier Curves drawing capability. A two- or three-dimensional curved line extending through the vector sensors will be drawn and displayed on the display screen.

If it is necessary to obtain the absolute coordinate value of the sensing chip of each vector sensor, a smartphone with absolute coordinate sensing capability, such as a GPS application software, can be placed above the sensing chip of the vector sensor, to obtain the absolute coordinate value of the sensing chip. With this information, the absolute coordinate value of the sensing chip of each second vector sensor, as well as the absolute coordinate value of the first connector of the Nth second vector sensor, can be obtained after calculations.

In order to make the sensing result of the curved surface measurement device of the present invention more accurate, in the second vector sensor 20, the position of the sensing chip 17 preferably projects into the area of the rotating connecting member of the second connecting member 14. Usually, the rotary connection is preferably disposed directly below the sensing chip 17, as shown in FIG. 2, or directly above. But this arrangement is not any technical limitation. In addition, in order to simplify the calculation, the length from the sensing chip 17 to the first connector 13 of the vector device of the individual vector sensors 10 and 20 is preferably the same for each vector sensor 12. But this is not any technical limitation either.

In a preferred embodiment of the present invention, the individual vector sensors 10 and 20 may also provide attachment/fixing elements (not shown) for attaching/fixing the main body 11 to a measured surface. This arrangement, although not any technical limitation, is very useful when, for example, measuring the curved surface of the human body, or other similar surfaces. The attachment element has different forms of selection possibilities for different applications. For example, when measuring a surface with a distance of hundreds of meters, the attachment element that may be used is completely different from that when measuring a surface with a length of several centimeters. If an attachment element is used, the center of the attachment element preferably coincides with the sensing chip 17. For example, directly below or above the sensing chip 17.

If a large-scale curved surface is to be measured, such as the ground in a tunnel, only one first vector sensor can be used, and a powered moving device, such as a vehicle, can carry the main body of the vector sensor. The main body is equipped with a GPS chip, the vector sensor is moved to the tunnel mouth, and the absolute coordinates of the main body and the relative vector of the end point of the vector sensor are measured. Then, the main body is moved to the original position of the end point of the vector device by the powered moving device, and the relative vector of the end point of the first vector device is measured. The measurement is done point by point, until the tunnel exits. Collecting the measurement results, it is possible to delineate the shape of the ground inside the tunnel. The vector length of the vector sensor can be set to, for example, 10M. Then only 100 points need to be measured per kilometer to complete the description of the ground shape.

In this application example, the curved surface measurement device comprises a vector sensor and a powered moving device carrying the vector sensor; the vector sensor comprises:

- a main body and a vector device connected thereto; the vector device comprising a linear extension;
- a sensing chip for sensing a vector of gravity to generate a gravity vector sensing value;
- a processing circuit, coupled to the sensing chip, for receiving a sensing result of the sensing chip, and calculate a relative vector value of a vector from the sensing chip to the first connector relative to a vector system of the sensing chip, according to said sensing result;
- a wireless communication circuit, connected to the processing device, to transmit the calculating result of the processing circuit to the external through a wireless communication channel; and
- a power supply for providing electrical power to the sensing chip, the processing circuit and/or the wireless communication circuit.

The curved surface measurement device may further comprise a GPS chip for measuring the coordinates of the position of the sensing chip. In this instance, the sensing value of the vector sensor can be used to calculate a relative vector value of a vector from the sensing chip to the connection member of the first connector of the vector sensor relative to the gravity vector; the relative vector can be expressed by an angle formed by the vector and a specific vector and relative length.

Figure 3:
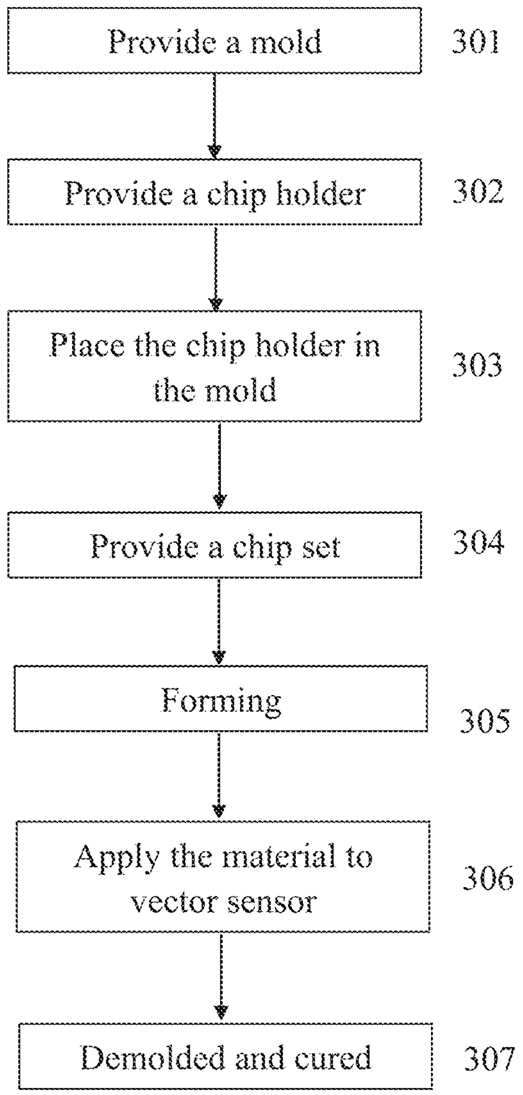
FIG. 3 is a flowchart showing an embodiment of the method for preparing a vector sensor of the invented curved surface measurement device.

A method of the preparation of the invented curved surface measurement device will be described below. FIG. 3 is a flowchart showing an embodiment of the method for manufacturing a vector sensor for the curved surface measurement device of the present invention. FIGS. 4A to 4D are schematic diagrams of manufacturing stages of the vector sensor of FIG. 3. The following description is made with reference to the drawings.

Figure 4A:
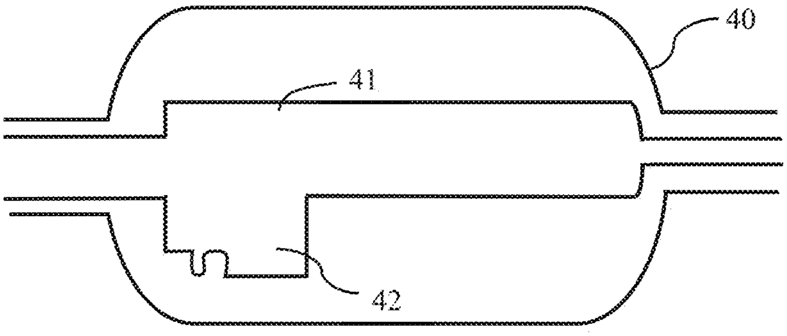
FIGS. 4A to 4D show the manufacturing steps of the embodiment of FIG. 3.
Figure 4B:
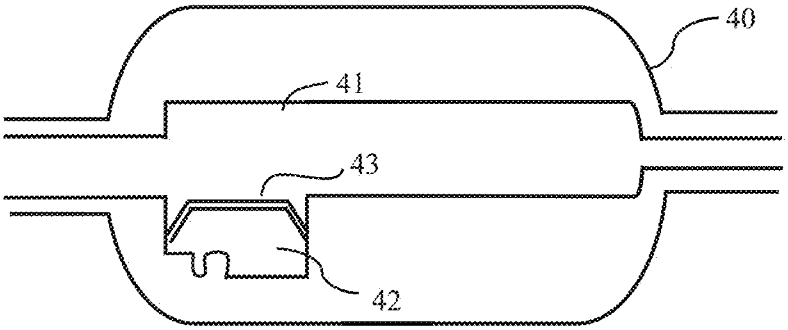
Figure 4C:
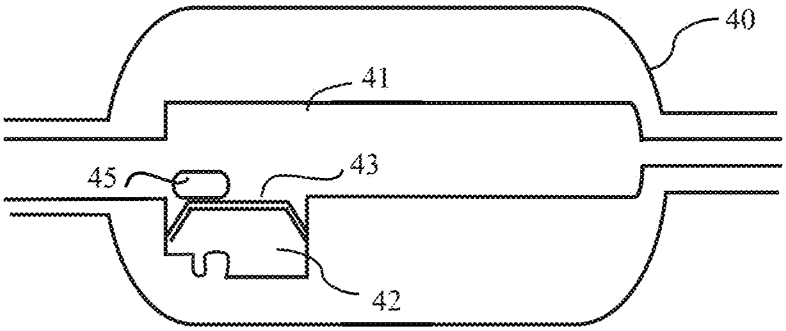
Figure 4D:
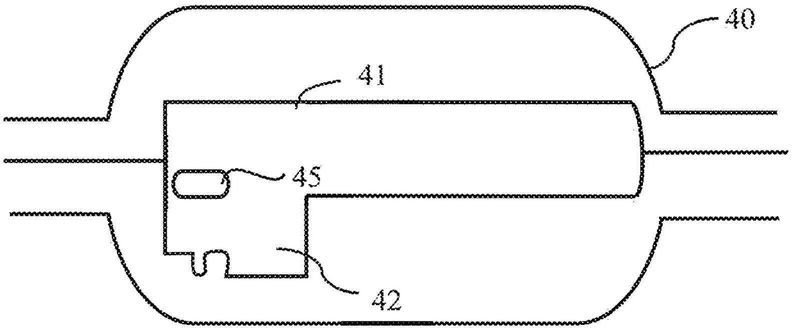

As shown in FIG. 3, the preparation method of the invented vector sensor may include the following steps: in step 301, a mold 40 is provided. The mold 40 provides a vector sensor forming space 41 that includes a second connector Forming space 42, as shown in FIG. 4A. In step 302, a chip holder 43 is provided. The chip holder provides an accommodating space for the sensing chip 17. In step 303, the chip holder is placed in the mold, so that the sensing chip accommodating space of the chip holder and the second connecting member forming space are overlapped up and down, as shown in FIG. 4B. In step 304, a chip set 45 is provided. The chip set 45 has a sensor chip 17, such as an inertial sensor, as well as a processing circuit 21, a wireless communication circuit 18, a memory device 23, a power supply device, and the like electrically connected to the sensor chip. In step 305, the chip set is placed in the sensing chip accommodating space of the chip holder 43 and fixed therein, as shown in FIG. 4C. Next, in step 306, the material of the vector sensor is applied to the vector sensor forming space and hardened. After this step, the chip holder 43 forms part of the vector sensor main body 11. The chip set 45 is also positioned and fixed above the second connecting member 14, as shown in FIG. 4D. In step 307, the vector sensor is demolded and cured. The fabrication of the vector sensor is completed.

Figure 5:
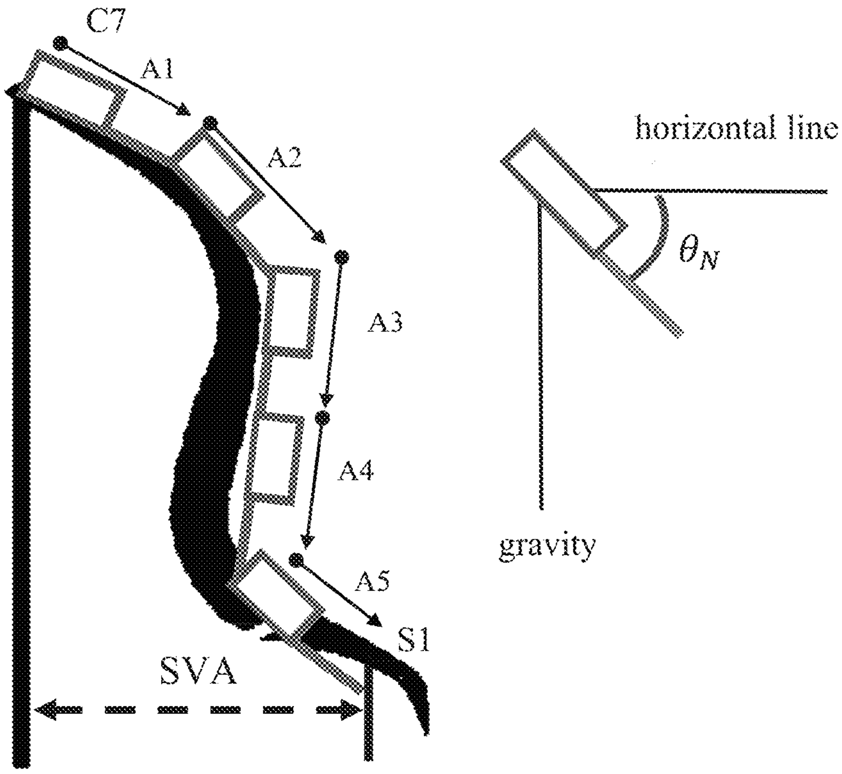
FIG. 5 shows a schematic diagram of an exemplary application of the curved surface measurement device of the present invention for measuring the back of a human body.

FIG. 5 shows a schematic diagram of an application example of the curved surface measurement device of the present invention for measuring the back of a human body. The purpose of this application example is mainly to determine whether the patient is hunched or slanted. As shown in the figure, five vector sensors A1-A5 are used to measure the horizontal distance from the 7th cervical vertebrae C7 to the 1st sacral vertebra S1. The C7-S1 curve in the figure represents the back surface of the human body.

The curved surface measurement device comprises a first vector sensor A1 and four second vector sensors A2-A5, which are connected to each other by a first connector 13 and a second connector 14. Attach the five vector sensors A1-A5 to the back of a subject in sequence, preferably along the spine. Pay attention to the stretch length when attaching. If the total length of the vector sensors is insufficient, the number can be increased arbitrarily. And vice versa. Before or during use, connect all vector sensors A1-A5 to the mobile APP and physically connect them. After startup, use the mobile phone APP to collect the sensing values of all vector sensors A1-A5. Use the computing function of the smartphone APP to calculate the direction and length of the vector represented by the sensing result of each vector sensor A1-A5 relative to the gravity vector. That is, the angle and length of the vectors represented by the vector devices 12 of the vector sensors A1-A5, relative to the vector of gravity.

The calculation result is A1=(θ1,L1), A2=(θ2,L2), A3=(θ3,L3), A4=(θ4,L4), A5=(θ5,L5).

The smartphone APP can draw the C7-S1 curve on the smartphone display, as shown in FIG. 5. In addition, the smartphone APP can also calculate the horizontal distance from the C7 point to the S1 point on the plane by the following formula. This distance is called SVA (sagittal vertical axis) in the medical science, and can be used to determine whether the subject is hunchbacked:

$$\mathrm{SVA}=\Sigma L_N\times\cos\theta_N \tag{4}$$

Among them, if $\theta_N<90°$, $\cos\theta_N>0$; if $\theta_N>90°$, then $\cos\theta_N<0$.

By comparing the horizontal distance with a reference value (for example, the SVA standard value is 46 mm), it can be determined whether the subject is hunchbacked. The values obtained in this embodiment can also be applied to various judgments for medical, rehabilitation, sports, and training purposes.

In equation (4), each included angle may not lie in the same plane or project to the same plane. However, this offset in the direction is usually negligible because, in application, most vector sensors are usually located or substantially located in the same plane.

The curved surface measurement device of the present invention can be applied to the measurement of various curved surfaces. The scales measured can be as small as human organs and as large as transportation facilities. Since the vector device provides a vector with a known direction and a known length, and the vector sensor provides wireless communication function, any curved surface can be measured by the present invention, without being limited by the environment, and without invading the measured object. The present invention provides benefits that cannot be provided by the prior art.

What is claimed is:

1. A curved surface measurement device, comprising a first vector sensor and a plurality of N second vector sensors, wherein N is a natural number; wherein each vector sensor comprises:

- a main body and a vector device connected to the main body; the vector device comprising a linear extension and an end of the vector device remote from the main body providing a first connector;
- a second connector arranged on the main body of the second vector sensor, at an end opposite to the vector device;
- wherein the first connector is provided with a connecting member, and the second connector is provided with a rotating connecting member for connecting with a connecting member of a first connector of another vector device; and wherein the second connector is located on an extension line of the vector device;
- a sensing chip for sensing a vector of gravity to generate a gravity vector sensing value;
- a wireless communication circuit, connected to the sensing chip, to transmit the sensing value to the external through a wireless communication channel; and
- a power supply for providing electrical power to the sensing chip and/or the wireless communication circuit;
- wherein a sensing value signal transmitted by the wireless communication circuit comprises the sensing value and a code representing the vector sensor; and
- wherein, in the second vector sensor, a position of the sensing chip projects into an area of the rotating connecting portion of the second connector.

2. The curved surface measurement device of claim 1, wherein the sensing chip comprises an inertial sensor, and the inertial sensor is an accelerometer or a gyroscope.

3. The curved surface measurement device of claim 1, wherein the second connector is disposed within the coverage of the main body, and an opening or a cutout is provided in the main body for access by a first connector of another vector sensor, to form a rotatable connection with the second connector.

4. The curved surface measurement device of claim 1, wherein a length between the sensing chip and the connection member the first connector of the vector device is the same for each vector device.

5. The curved surface measurement device of claim 1, further comprising an attachment element for attaching the main body to a measured surface.

6. The curved surface measurement device of claim 5, wherein the center of the attached element coincides with the sensing chip.

7. The curved surface measurement device of claim 1, further comprising a computing device equipped with a wireless communication function to receive the sensing result of each vector sensor, and to calculate a relative vector value of a vector from the sensing chip to the first connector of the vector device of each vector sensor, according to the received sensing result.

8. The curved surface measurement device of claim 7, wherein the computing device is further configured to calculate a vector from the sensing chip of the first vector sensor to the first connector of the vector device of the Nth vector sensor.

9. The curved surface measurement device of claim 8, wherein the computing device is built in a smartphone in the form of application software.

10. The curved surface measurement device of claim 7, wherein the computing device is built in a smartphone in the form of application software.

11. The curved surface measurement device of claim 7, wherein the sensing chip is further provided with a memory device for storing a vector value of a vector from the sensing chip to the first connector of the vector device and a code of the vector sensor.

12. The curved surface measurement device of claim 11, wherein the computing device is configured to calculate a vector value from the sensing chip to the first connector of the vector device of each vector sensor, or a vector value from the sensing chip of the first vector sensor to the first connector of the vector device of the Nth vector sensor, according to a code representing the respective vector sensor and the sensing result.

13. The curved surface measurement device of claim 1, wherein a sensing value signal transmitted by the wireless communication circuit comprises a vector value of a vector device of the vector sensor.

14. A curved surface measurement device, comprising a first vector sensor and a plurality of N second vector sensors, wherein N is a natural number; wherein each vector sensor comprises:

a main body and a vector device connected to the main body; the vector device comprising a linear extension and an end of the vector device remote from the main body providing a first connector;

a second connector arranged on the main body of the second vector sensor, at an end opposite to the vector device;

wherein the first connector is provided with a connecting member, and the second connector is provided with a rotating connecting member for connecting with a connecting member of a first connector of another vector device; and wherein the second connector is located on an extension line of the vector device;

a sensing chip for sensing a vector of gravity to generate a gravity vector sensing value;

a wireless communication circuit, connected to the sensing chip, to transmit the sensing value to the external through a wireless communication channel; and a power supply for providing electrical power to the sensing chip and/or the wireless communication circuit;

wherein a sensing value signal transmitted by the wireless communication circuit comprises the sensing value and a code representing the vector sensor; and further comprising a processing circuit, connected to the sensing chip, for receiving the sensing result of the sensing chip, and converting the sensing result into spatial position representation data, comprising a coordinate value or a vector value, and to calculate a relative vector value of a vector from the sensing chip to the first connector of the vector device of respective vector sensors, relative to the gravity vector and/or an absolute vector value of a vector from the sensing chip to the first connector of the vector device of respective vector sensors; wherein the power supply device provides electrical power to the processing circuit.

15. The curved surface measurement device of claim 14, wherein only one vector sensor is provided with the processing circuit, wherein each sensing chip transmits the sensing results to the processing circuit via the wireless communication circuit.

16. The curved surface measurement device of claim 14, wherein the processing circuit is configured to calculate a relative vector value of a vector from the sensing chip of the first vector sensor to the first connector of the vector device of the Nth vector sensor.

17. The curved surface measurement device of claim 16, wherein only the first vector sensor is provided with the processing circuit.

18. The curved surface measurement device of claim 14, wherein the sensing chip is further provided with a memory device for storing a vector value of a vector from the sensing chip to the first connector of the vector device and a code of the vector sensor.

19. The curved surface measurement device of claim 14, wherein the processing circuit is configured to calculate a vector value from the sensing chip to the first connector of the vector device of each vector sensor, or a vector value from the sensing chip of the first vector sensor to the first connector of the vector device of the Nth vector sensor, according to a code representing the respective vector sensor, the sensing result and the processing result of the processing circuit.

20. A curved surface measurement device, comprising a vector sensor and a powered moving device carrying the vector sensor; the vector sensor comprising:

a main body and a vector device connected to the main body; the vector device comprising a linear extension;

a sensing chip for sensing a vector of gravity to generate a gravity vector sensing value;

a processing circuit, coupled to the sensing chip, for receiving a sensing result of the sensing chip, and calculate a relative vector value of a vector from the sensing chip to a far end of the vector device, according to said sensing result;

a wireless communication circuit, connected to the processing device, to transmit the calculating result of the processing circuit to the external through a wireless communication channel; and a power supply for providing electrical power to the sensing chip, the processing circuit and/or the wireless communication circuit;

wherein the relative vector value is expressed by a direction and a length.

21. The curved surface measurement device of claim 20, wherein the sensing chip comprises an inertial sensor, and the inertial sensor is an accelerometer or a gyroscope.

22. The curved surface measurement device of claim 20, further comprising a GPS chip for measuring coordinates of a location of the sensing chip.

23. A vector sensor for curved surface measurement device, comprising:

a main body and a vector device connected to the main body; the vector device comprising a linear extension and an end of the vector device remote from the main body providing a first connector;

a second connector arranged on the main body, at an end opposite to the vector device; wherein the first connector is provided with a connecting member, and the second connector is provided with a rotating connecting member for connecting with a connecting member of a first connector of another vector device; and wherein the second connector is located on an extension line of the vector device;

a sensing chip for sensing a vector of gravity to generate a gravity vector sensing value;

a processing circuit, connected to the sensing chip, for receiving the sensing result of the sensing chip, and converting the sensing result into spatial position representation data, comprising a coordinate value or a vector value, and to calculate a relative vector value of a vector from the sensing chip to the first connector of the vector device of respective vector sensors, relative to the gravity vector and/or an absolute vector value of a vector from the sensing chip to the first connector of the vector device of respective vector sensors;

a wireless communication circuit, connected to the processing circuit, to transmit the processing result to the external through a wireless communication channel; and a power supply for providing electrical power to the sensing chip, the processing circuit and/or the wireless communication circuit;

wherein a sensing value signal transmitted by the wireless communication circuit comprises the sensing value and a code representing the vector sensor.

24. The vector sensor of claim 23, wherein the sensing chip comprises an inertial sensor, and the inertial sensor is an accelerometer or a gyroscope.

25. The vector sensor of claim 23, wherein a position of the sensing chip projects into an area of the rotating connecting portion of the second connector.

26. The vector sensor of claim 23, comprising an attachment element for attaching the main body to a measured surface.

27. The vector sensor of claim 26, wherein the center of the attached element coincides with the sensing chip.

28. The vector sensor of claim 23, wherein the sensing chip is further provided with a memory device for storing a vector value of a vector from the sensing chip to the first connector of the vector device and a code of the vector sensor.

* * * * *